United States Patent
Lundin

(10) Patent No.: US 9,816,242 B2
(45) Date of Patent: Nov. 14, 2017

(54) CLEANING DEVICE FOR OIL COLLECTING BRUSH

(71) Applicant: M & L Patent Oy Ab, Hanko (FI)

(72) Inventor: Lars Lundin, Hanko (FI)

(73) Assignee: M & L Patent Oy Ab, Hanko (FI)

( * ) Notice: Subject to any disclaimer, the term of this patent is extended or adjusted under 35 U.S.C. 154(b) by 0 days.

(21) Appl. No.: 14/892,210

(22) PCT Filed: May 21, 2014

(86) PCT No.: PCT/FI2014/050393
§ 371 (c)(1),
(2) Date: Nov. 19, 2015

(87) PCT Pub. No.: WO2014/188075
PCT Pub. Date: Nov. 27, 2014

(65) Prior Publication Data
US 2016/0083923 A1  Mar. 24, 2016

(30) Foreign Application Priority Data
May 21, 2013 (FI) .................................. 20130144

(51) Int. Cl.
| | |
|---|---|
| *C02F 1/40* | (2006.01) |
| *E02B 15/04* | (2006.01) |
| *E02B 15/10* | (2006.01) |
| *B63B 35/32* | (2006.01) |
| *B08B 1/00* | (2006.01) |

(52) U.S. Cl.
CPC ............ *E02B 15/103* (2013.01); *B08B 1/006* (2013.01); *B63B 35/32* (2013.01); *C02F 1/40* (2013.01); *E02B 15/04* (2013.01); *E02B 15/10* (2013.01)

(58) Field of Classification Search
CPC . C02F 1/40; E02B 15/04; E02B 15/10; A47L 25/00
See application file for complete search history.

(56) References Cited

U.S. PATENT DOCUMENTS 3,617,555 A  11/1971 Ginshurgh et al.
4,264,450 A   4/1981 Ayers et al.
(Continued)

FOREIGN PATENT DOCUMENTS

CN    101761061 A    6/2010
CN    202519650 U   11/2012
(Continued)

*Primary Examiner* — Randall Chin
(74) *Attorney, Agent, or Firm* — Seppo Laine Oy

(57) ABSTRACT

The cleaner according to the invention includes a body part, which includes curved wiping tongues. The lower part of the body is the cleaner's curved lower plate and in its upper part are upper plates and an attachment plate, which is attached to the body of the collector by an attachment beam. The construction of the collector is based on discs surrounding a drum and permitting water to flow through them, to which are attached plastic rings and, attached to them, a brush ring formed of brushes extending over the curved rear wall. The invention also discloses a cleaner, by means of which the brushes are cleaned, which, for example, are attached to a V-shaped brush structure, in which there is a plastic bodied brush ring, and in the cleaner there is a point-shaped plate and its bent point shape.

10 Claims, 5 Drawing Sheets

(56) References Cited

U.S. PATENT DOCUMENTS

| | | | | |
|---|---|---|---|---|
| 4,473,469 A | * | 9/1984 | Ayroldi | E02B 15/102 210/242.3 |
| 6,471,862 B1 | * | 10/2002 | Rockwell | B63B 35/32 210/242.3 |
| 7,303,688 B2 | * | 12/2007 | Pertile | B01D 17/0214 210/242.3 |
| 8,388,839 B1 | * | 3/2013 | Hobson | E02B 15/102 210/232 |

FOREIGN PATENT DOCUMENTS

| | | |
|---|---|---|
| EP | 0219123 A1 | 4/1987 |
| FI | 66952 B | 8/1984 |
| FI | 107280 B | 6/2001 |
| FI | 107280B-D1 | 6/2001 |
| FI | 123412 B | 4/2013 |
| FI | 20125704 A | 12/2013 |
| WO | WO 9964683-D2 | 12/1999 |
| WO | WO 2004025034-D3 | 3/2004 |

\* cited by examiner

CLEANING DEVICE FOR OIL COLLECTING BRUSH

The invention relates to a cleaner, i.e. a cleaning device, for cleaning oil from a brush system collecting oil. In particular, the invention relates to a device that is suitable for use to clean a brush device used for collecting light oils, such as diesel and crude oil.

The invention also relates to the use of a cleaning device for separating oil from an oil-collector brush.

DESCRIPTION OF RELATED ART

The prior art in the field of the invention is, for example, a cleaner disclosed in publication print FI 66952, in which the rectangular tongues of the cleaner detach the oil from the brush by wiping them.

The general level of the prior art is represented by FI patent 107280 and application publications WO9964683 and WO2004025034.

The background to the new idea is Finnish patent 123412 and particularly Finnish patent application FI 20125704, which describe the use of, for instance, a brush ring for collecting oil. Such an oil collector includes a brush equipped with bristles, typically straight bristles, and a horizontal shaft. The bristles of the brush are essentially parallel to the horizontal axis of rotation of the brush. Thus the bristles rotate in the transverse direction, i.e. come into contact laterally with the surface of the oily water to be cleaned, i.e. simultaneously over their entire length. Similarly, they rise from the water to be cleaned transversely, so that the centrifugal force caused by the rotation of the brush does not slide the oil along the surface of the bristles in their longitudinal direction, but instead the centrifugal force acts of the surface of the bristles in a perpendicular direction.

If rectangular tongues are used in the cleaner to wipe generally cylindrical brushes, it has proved to be very difficult to collect oil, particularly if the oil in question is light oil. The oil contained in the brush rings of the brushes tends to flow off the brushes, or to flow back once the oil has been wiped and recovered.

BRIEF SUMMARY OF THE INVENTION

The present invention is intended to eliminate problems relating to the prior art and create a new type of solution for cleaning an oil collector brush.

By means of the invention it is sought particularly to create a cleaning device, which has a construction that it is able to clean brushes attached laterally to a brush ring, especially when collecting oil that is difficult to collect.

The invention also creates a solution for separating from a brush ring light oils, such as diesel and crude oil, and similar oils that are difficult to collect.

The invention is based on the idea of wiping oil from the bristles of the brush drum by using curved tongues.

The cleaning device comprises, for example, a structure, arranged in the upper part of the brush of the oil collector, for cleaning the brush of oil, which structure there is a body and, attached to the body, tongues arranged with a curved surface. The body of the cleaning device forms, for example, a curved bottom plate of the lower part of the cleaner and one, or preferably several, upper plates in the upper part, in such a way that there are curved wiping tongues between the bottom plate and the upper plate. The cleaner is attached to the body of the collector by means of, for example, an attachment sheet, i.e. an attachment plate.

The basic structure of the body of the collector can consist of, for example, a drum surrounded by discs that pass water through, to which brush rings are attached. The device is arranged in connection with a brush ring.

The curved cleaner is particularly intended for use, for example, when collecting oil with a brush drum, in which the brushes of the brush disc are attached transversely to a plastic ring.

In operation, the construction of the cleaner, relative to the construction of the brush extending to the curved rear wall of the body of the collector, is such that the curved bottom and the transverse brushes attached to the plastic ring create, together with the tongues, a tight plough-shaped obstacle. When the brush drum rotates and meets the plough-shaped obstacle, the wiped oil flows over the curved rear wall of the collector body.

Here a cleaner is also disclosed, by means of which brushes are cleaned, which, for example, are attached to a V-shaped brush structure in which there is a plastic-bodied brush ring and in the cleaner there is a point-shaped plate and its bent point shape.

The cleaning device is able to clean brushes attached laterally to a brush structure, especially when collecting oil that is difficult to collect. The device is suitable for separating, for instance, diesel and crude oil from the brushes.

The construction of the cleaner relative to the construction of the brush is such that, when the brush drum rotates the brush rings of the brush drum, it permits or assists recovery, and promotes the flow of oil wiped from the brushes over the rear wall of the collector body.

By means of the cleaning manner described, the journey of oil from the water to the cleaner is very short and the collection of oil is maximized.

On the basis of modification of the structures of cleaners according to the invention, the cleaner is especially suitable and intended for use mainly when collecting oil with a brush drum.

Several cleaners according to the invention can be placed next to each other and thus, for example, a device with the desired capacity can be constructed.

BRIEF DESCRIPTION OF THE SEVERAL VIEWS OF THE DRAWINGS

In the following, embodiments are described in detail with reference to the accompanying drawings.

FIG. 1A shows a side view and FIG. 1C a top view of a construction according to one embodiment, while

DETAILED DESCRIPTION OF THE INVENTION

Figure 1A:
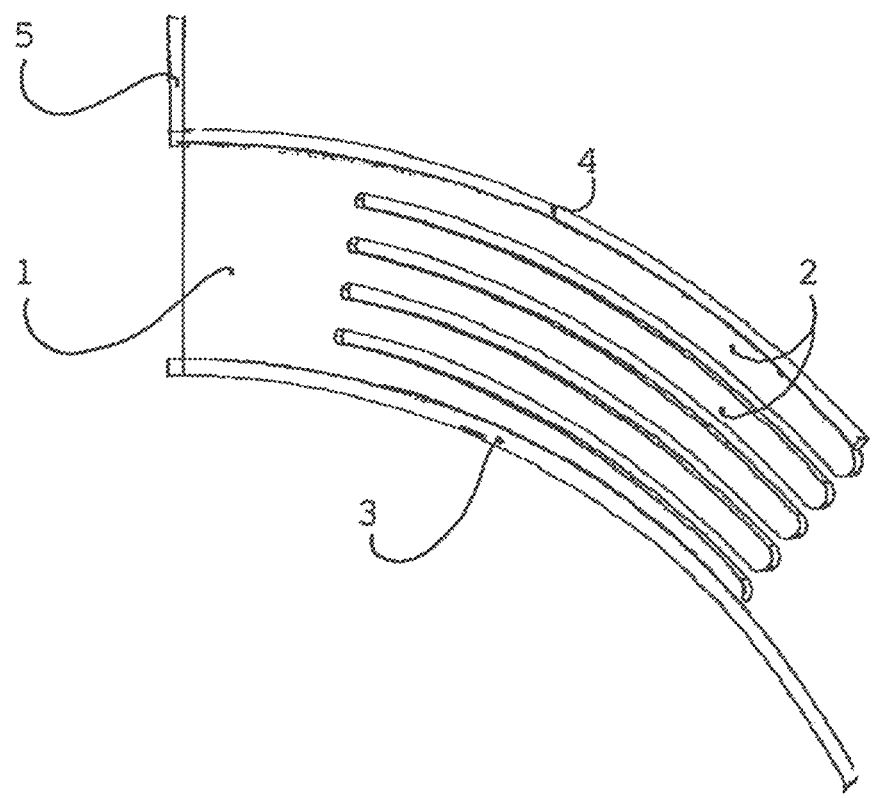

In the present case, the term "brush ring" refers, for example, to a plastic ring, to which the brushes, i.e. bristles are attached. The term brush ring particularly refers to a construction, in which the bristles are attached laterally to the side of the ring, parallel to the axis of rotation of the ring, i.e. axially. In one embodiment, the term brush ring refers to a brush construction according to the patent application FI 20125704 described above.

The contents of FI patent application 20125704 is attached to the present application by way of reference.

The oil collector according to FI application 20125704 typically includes a solid drum with a horizontal shaft. When the device is in operation, its axis of rotation is thus parallel to the surface of the water. An annular flange is attached to the outer surface of the drum, i.e. a brush support around the drum. There are a suitable number of brush supports at a distance to each other in the axial direction. A plate-like attachment flange runs around the outer circumference of the brush support at right angles to the brush support. The brush support is equipped, for example, with flow openings, which permit the flow of water on the surface of the drum, in its axial direction.

In the attachment flange is a brush body, to which bristles are attached over the length of the circumference on two opposite sides, in such a way that the bristles protrude from the brush body in opposite directions in the axial direction of the drum.

When the oil collector that has been described is used, oil from the flowing water adheres to the bristles and remains on them while sliding outwards towards the comb structure that cleans the bristles.

On the basis of what is described above, in one embodiment the structure of the present oil collector comprises a drum attached to the collector's body, which is surrounded by discs that pass water through them, in which there are oil-collecting brush rings.

In the oil collector, there is a structure, for example, a comb-like structure, for separating the oil from the bristles. Such a structure can also be called a cleaner, i.e. a cleaning device. In the cleaner are tongues that wipe the oil off the oil collector's bristles.

Particularly the tongues are curved, more specifically they have a curved surface, and most suitably they are curved in the longitudinal direction of the tongue.

The curvature of the tongues can be, for example, roughly the magnitude of the curvature of the circumference of the brush drum, or slightly larger than it. Thus, in one embodiment the tongues curve roughly in the direction of the circumference of the brush drum; in another embodiment their curvature is sufficiently greater than that, so that the tongues curve towards the circumference of the brush drum. Most suitably however, the free end of the tongues points in the direction opposite to the direction of rotation of the brush drum.

In a second embodiment, the invention is based on the idea that the longitudinal axis of the tongues is at an angle to the tangent of the circumference of the brush drum, i.e. the tongues are at least to some extent tilted relative to the tangent. Most suitably, the tongues are oriented outwards from the tangent.

As described above, the body of the cleaner is preferably formed by the curved bottom plate of the cleaner's lower part and the upper plates in the upper part, between which are the curved wiping tongues. The device is arranged in connection with the brush ring; most suitably it is attached to the body of the oil collector. It can be attached to it, for example, by an attachment plate or similar sheet, or by some other rigid attachment element, either directly or by means of an attachment beam.

The curved cleaner is intended to be used mainly when collecting oil with a brush drum, in which the bristles of the brush ring are attached transversely to a plastic ring, as described above.

In operation, the construction of the cleaner relative to the construction of the brush extending to the curved rear wall of the body of the collector is such that the curved bottom and the transverse brushes attached to the plastic ring create, together with the tongues, a tightly fitting plough-shaped obstacle. The plough-likeness is illustrated in the accompanying drawings. Generally, this means that the tongues are arranged relative to each other in a V shape, at least longitudinally, but possibly also transversely. When the brush drum rotates, the oil wiped when it meets the plough-shape obstacle flows over the curved rear wall of the collector body. Using such cleaning, the journey of the oil being cleaned from the water to the cleaner is very short and the oil collection is maximized.

As an example, the cleaner can be constructed in such a way that between the centre lines of the plastic rings of each brush ring is a separate cleaner attached to an attachment beam of the collector body. The width of the bottom plate determines the space between the plastic rings in an axial direction and the width of the upper plates, viewed from above, is the distance between two plastic rings.

A modified cleaner bottom plate can be used with V-shaped brushes, in such a way that in the cleaner is a point-shaped plate, so that the escape of the oil is prevented when it is being collected. The bottom plate is most suitably shaped to form a narrowing point in the direction of the free end of the tongues. In this case, the point-shaped plate and its bent point shape extend over the rear wall of the collector body.

Embodiments of the new technique are shown in the drawings.

FIG. 1A shows a side view of a cleaner, the body component 1 of which includes curved wiping tongues 2. The lower part of the body is the curved bottom plate 3 of the cleaner and in its upper part are the upper plates 4, in addition, there is an attachment plate 5 in the body.

Figure 1B:
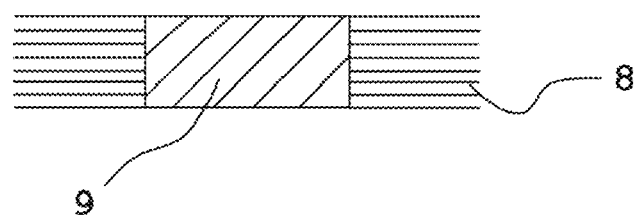
FIG. 1B shows a cross-section of the shape of the brush.

FIG. 1B shows a cross-section along the diameter of the plastic rings 9 and the brushes 8 to be cleaned and attached to them.

Figure 1C:
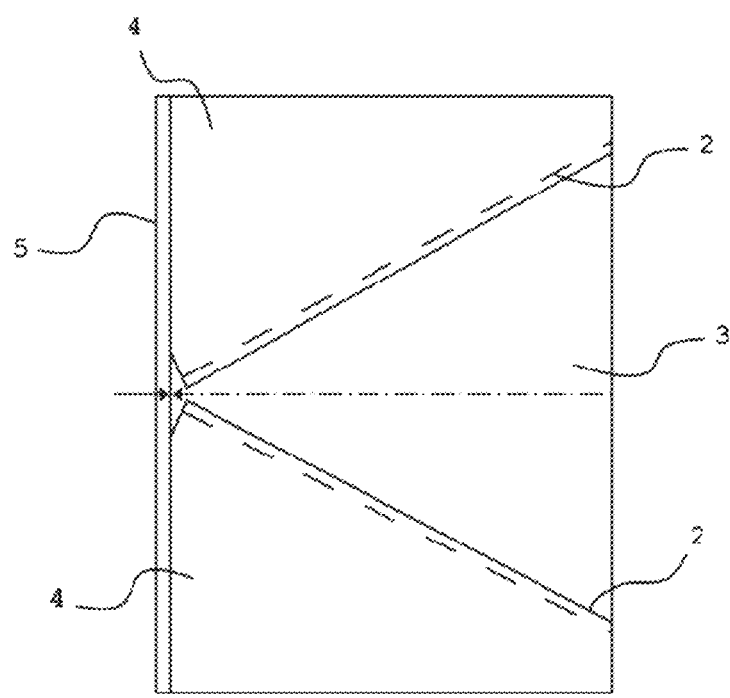

FIG. 1C shows a top view of the cleaner, which includes upper plates 4 and a lower plate 3, between which are plough-shaped curved tongues 2, as well as an attachment plate 5 in the body.

Figure 1D:
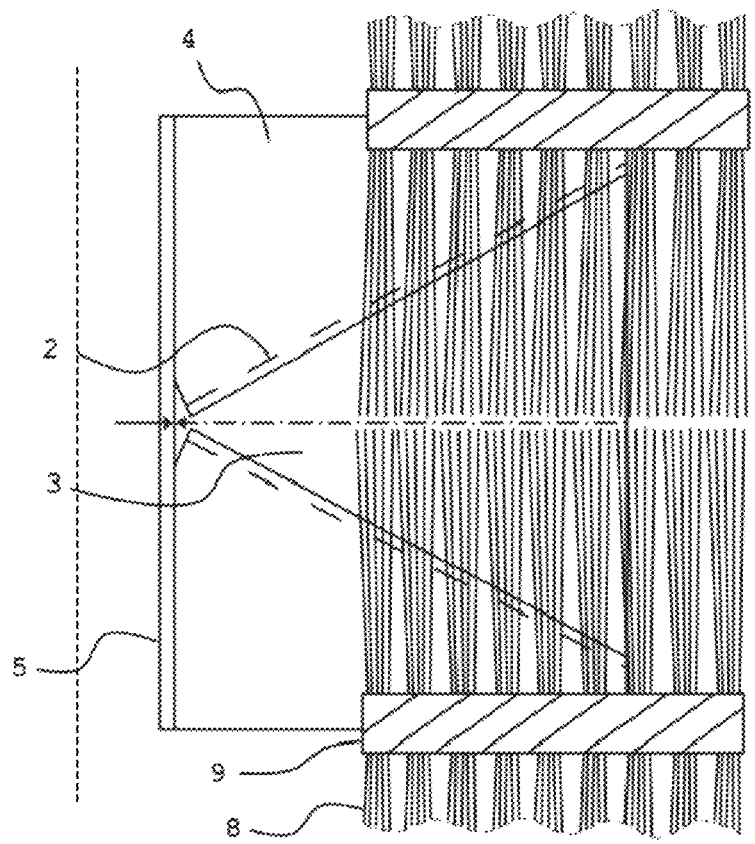
FIG. 1D shows an illustration corresponding to FIG. 1C of how the tongues of the cleaning device, fitted between two adjacent brush drums, wipe the bristles of the brush drum.

FIG. 1D shows a top view of the of the cleaner corresponding to FIG. 1C of how the tongues 2 of the cleaning device, fitted between two adjacent brush drums 9, wipe the bristles 8 of the brush drum. The dotted vertical line on the right represents a phantom line of the axis of the rotation brush ring.

Figure 2A:
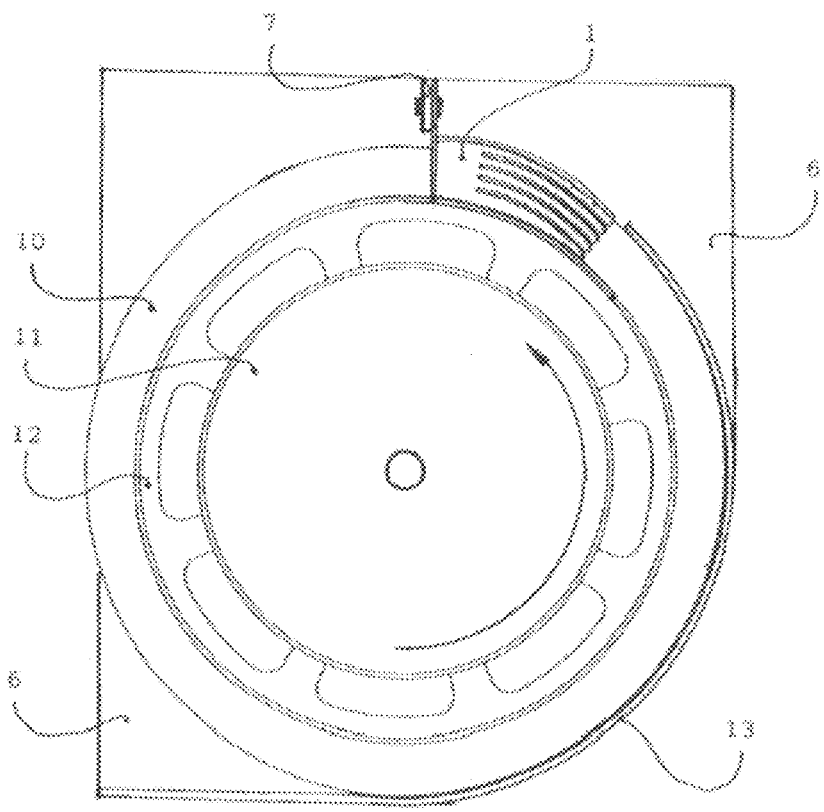
FIG. 2A shows a construction according to one embodiment as a cross-sectional side view and FIG. 2B as a top view, applied to the brush drum.

FIG. 2A shows a side view of the location of the cleaner installed in the body 6 of the collector, from which can be seen the collector's brush ring 10 and the discs 12, which pass water through them, surrounding the collector's drum 11. The figure also shows the curved rear wall 13 of the body 6. In addition, the figure shows the attachment beam 7 of the cleaner, by which the cleaner's body 1 is attached to the collector's body 6.

Figure 2B:
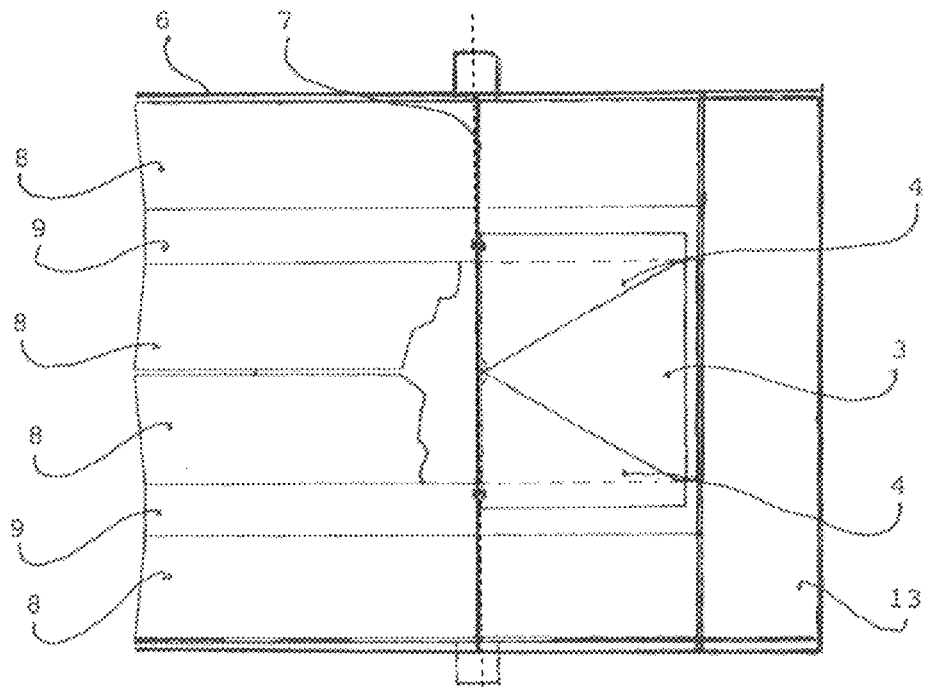

FIG. 2B shows a top view of the location of the cleaner, in such a way that the width of the cleaner, when seen from above, is the distance between the centre lines of the plastic rings. The width of the lower plate 3 is the distance between two plastic rings 9. The width of the upper plates 4 of the cleaner is the distance between the centre lines of two plastic rings 9. The figure also shows the opposing brushes 8 attached to the plastic ring 9, the curved rear wall 13 in the body 6, and the attachment beam 7 attached to the body 6. The dotted vertical line in the middle represents a phantom line of the axis of the rotation brush ring.

Figure 3A:
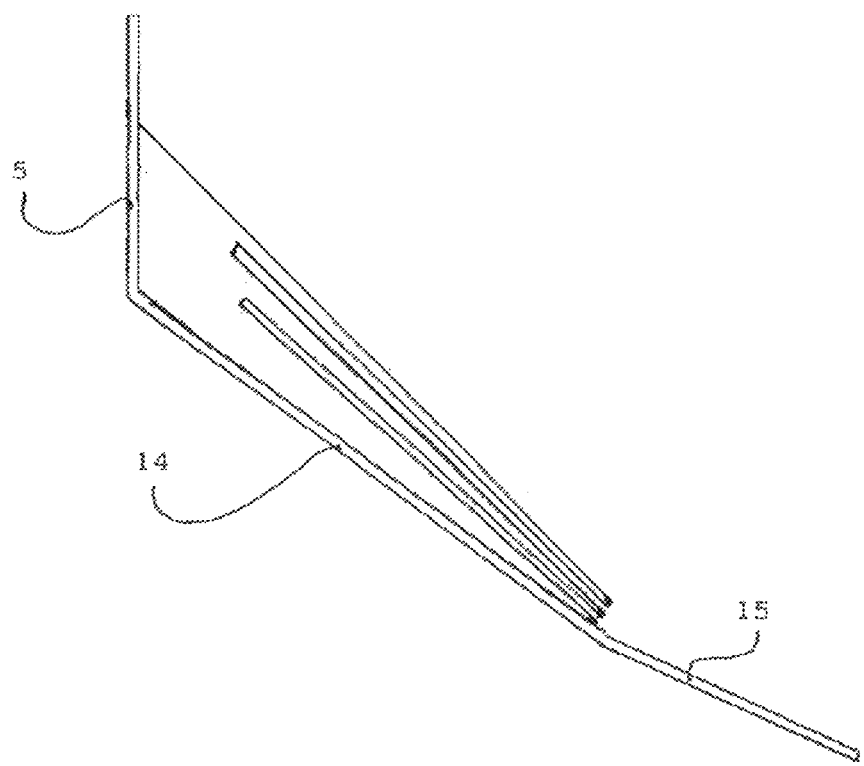
FIG. 3A shows a side view and FIG. 3B a top view of a modified shape according to a second embodiment, when in the embodiment shown there is a body and a point-shaped plate.

FIG. 3A shows a side view of the cleaner, in which there is a point-shaped plate 14 as well as its bent point shape 15 and attachment plate 5.

Figure 3B:
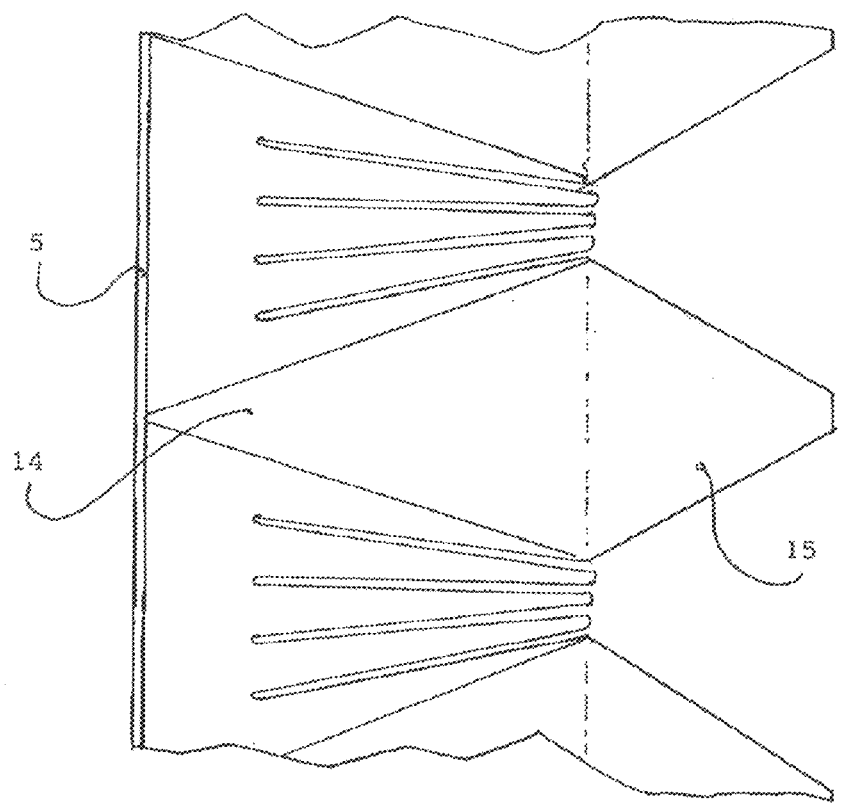

FIG. 3B shows a top view of the cleaner, in which there is a point-shaped plate 14 as well as its bent point shape 15 and attachment plate 5.

Figure 4A:
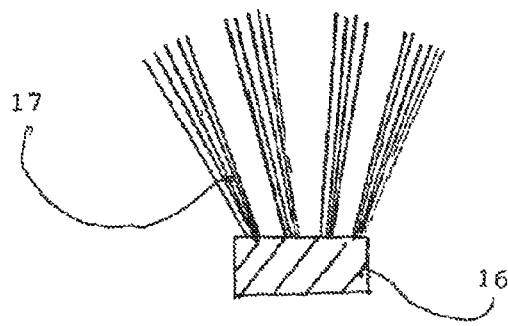
FIG. 4B shows an embodiment of the cleaner suitable for a brush drum and FIG. 4A a V-shaped brush construction.

FIG. 4A shows the construction of the V-shaped brush, in which there is a plastic body 16 and brushes (i.e. bristles) 17 attached to it.

Figure 4B:
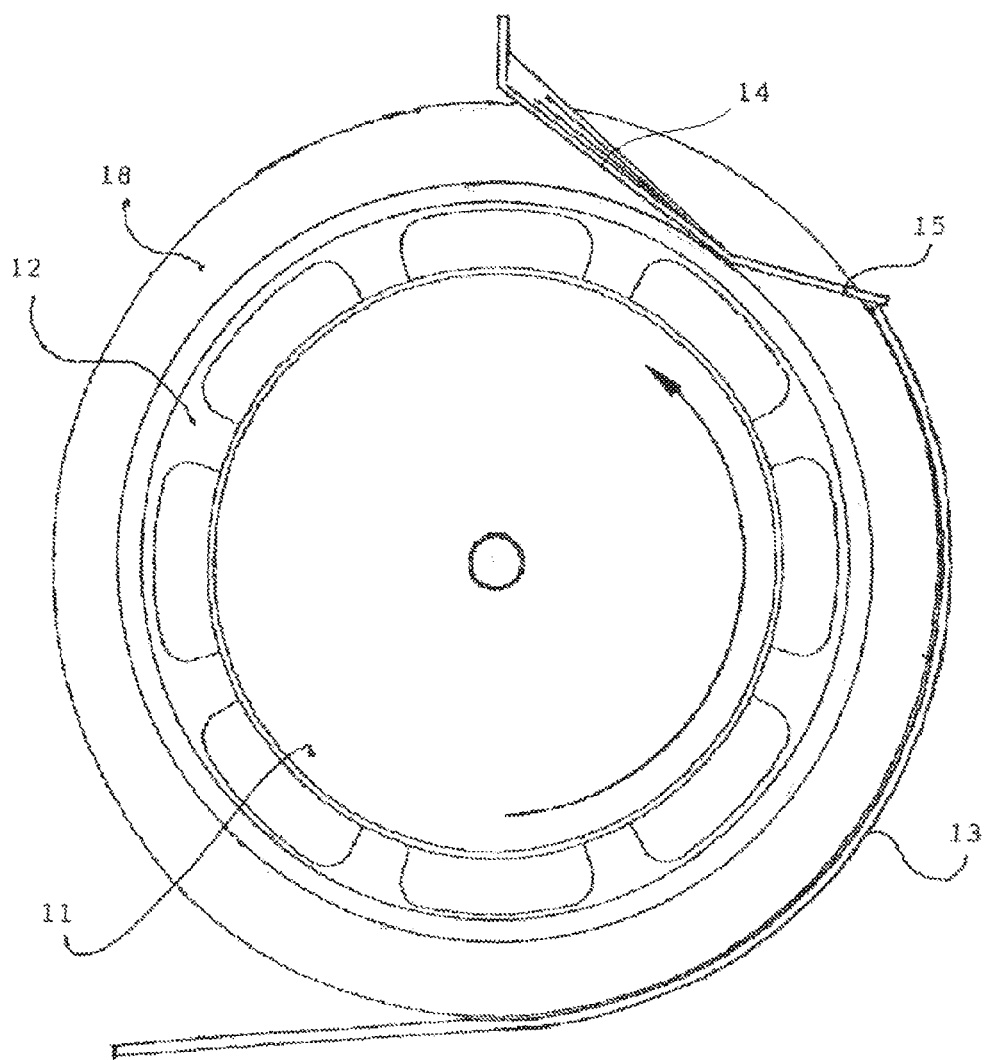

FIG. 4B shows a side view of the location of one cleaner, in which can be seen the collector's brush ring 18 and drum 11, as well as the discs 12 that surround it and pass water through. In addition, the figure shows the point-shaped plate 14 and its bent point shape 15, which extends to the curved rear wall 13 of the cleaner.

Further embodiments according to the invention are as follows:

Embodiment 1

Cleaner, which includes tongues wiping oil from the brushes of a collector, in which case the cleaner is characterized in that its body includes a lower plate and upper plates as well as curved tongues, with the aid of which the brushes attached laterally to the plastic ring of the brush ring are cleaned.

Embodiment 2

The cleaner as in embodiment 1, wherein it has plough-shaped tongues.

Embodiment 3

The cleaner as in embodiment 1, wherein the point-shaped plate and its bent point shape extends over the rear wall, particularly the rear wall of the oil collector.

Within FIGS. 1 and 2 are shown solutions, in which all the tongues are of equal thickness and equal width in the longitudinal direction. However, as can be seen from FIGS. 3 and 4, at least some of the tongues can, however, narrow laterally or when seen from above as illustrated.

The gaps between the tongues can be mutually of equal magnitude, or, as shown in FIGS. 1 and 2, they can be of different sizes.

The present device is suitable for use for wiping the brushes of various oil collectors. Although it is particularly suitable for separating from bristles light oils and similar organic substances that are immiscible with water, it can also be used for separating heavier substances.

LIST OF REFERENCE NUMBERS

1 body
2 tongues
3 lower plate
4 upper plate (upper plates)
5 attachment plate
6 body of oil collector
7 attachment beam
8, 17 bristles
9, 16 support ring (plastic ring)
10 brush ring
11 collector drum
12 disc
13 rear wall of collector
14 point-shaped plate
15 point (point shape)

The invention claimed is:

1. A cleaning device for an oil collecting brush ring of an oil collector, said cleaning device comprising:
a body having a lower plate, an upper plate and curved tongues for wiping oil from brushes of the oil collector,
wherein the curved tongues are capable of cleaning the brushes which are attached laterally to a support ring of the brush ring and the brushes are arranged essentially parallel to an axis of rotation of the brush ring.

2. The cleaning device according to claim 1, wherein the lower plate is curved and the body of the cleaning device is capable of being attached to a body of the oil collector.

3. The cleaning device according to claim 1, wherein the curved tongues are arranged in the shape of a plough.

4. The cleaning device according to claim 1, wherein the curved tongues have a curved surface in a longitudinal direction.

5. The cleaning device according to claim 1, wherein the lower plate is narrowing in a direction of a free end of the curved tongues.

6. The cleaning device according to claim 1, wherein said cleaning device is capable of being arranged between two adjacent brush rings in the oil collector where there are several adjacent brush rings.

7. An oil collector comprising:
an oil collecting brush ring having brushes, and
a cleaning device having curved tongues for wiping oil from the brushes of the oil collecting brush ring,
wherein the brushes are attached laterally to a support ring of the brush ring and the brushes are arranged essentially parallel to an axis of rotation of the brush ring, and wherein the cleaning device has a body having a lower plate, an upper plate, and the curved tongues, said curved tongues are capable of cleaning said laterally attached brushes.

8. The oil collector according to claim 7, further comprising a body, wherein the cleaning device is attached to said body of the oil collector.

9. The oil collector according to claim 7, wherein the cleaning device is arranged in connection with the brush ring.

10. The oil collector according to claim 7, further comprising several adjacent brush rings and wherein the cleaning device is arranged between two adjacent brush rings.

* * * * *